(12) United States Patent
Wessling et al.

(10) Patent No.: US 7,596,754 B2
(45) Date of Patent: Sep. 29, 2009

(54) APPLICATION ASSISTANCE

(75) Inventors: Cynthia D. Wessling, Redmond, WA (US); Mwanza N. Russell, Redmond, WA (US); Yihua Xiong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 11/192,447

(22) Filed: Jul. 28, 2005

(65) Prior Publication Data

US 2007/0028170 A1 Feb. 1, 2007

(51) Int. Cl.
*G06F 3/00* (2006.01)

(52) U.S. Cl. .................. 715/705; 715/708; 715/713

(58) Field of Classification Search ................ 715/705, 715/708, 713 M, 714 M, 202, 204; 707/102
See application file for complete search history.

(56) References Cited

U.S. PATENT DOCUMENTS

| | | | | |
|---|---|---|---|---|
| 5,179,654 A * | 1/1993 | Richards et al. | ............. | 715/708 |
| 5,423,023 A * | 6/1995 | Batch et al. | ................. | 717/117 |
| 5,581,684 A * | 12/1996 | Dudzik et al. | ............... | 715/708 |
| 5,680,617 A * | 10/1997 | Gough et al. | ............ | 707/104.1 |
| 5,765,140 A * | 6/1998 | Knudson et al. | ............... | 705/9 |
| 6,088,702 A * | 7/2000 | Plantz et al. | ............ | 707/103 R |
| 6,456,303 B1 * | 9/2002 | Walden et al. | ............. | 715/705 |
| 6,584,480 B1 * | 6/2003 | Ferrel et al. | ................. | 715/205 |
| 6,606,613 B1 * | 8/2003 | Altschuler et al. | ............ | 706/21 |
| 6,690,390 B1 * | 2/2004 | Walters et al. | ............. | 715/705 |
| 7,051,036 B2 * | 5/2006 | Rosnow et al. | ............. | 707/102 |
| 7,076,439 B1 * | 7/2006 | Jaggi | ............................. | 705/9 |
| 7,167,894 B1 * | 1/2007 | Boudnik et al. | ............. | 709/201 |
| 2001/0044738 A1 * | 11/2001 | Elkin et al. | ..................... | 705/8 |
| 2001/0044781 A1 * | 11/2001 | Shutes | ......................... | 705/59 |
| 2003/0041117 A1 * | 2/2003 | Dozier et al. | ............... | 709/217 |
| 2003/0061266 A1 * | 3/2003 | Ouchi | ........................ | 709/106 |
| 2003/0120704 A1 * | 6/2003 | Tran et al. | .................... | 709/104 |
| 2003/0163784 A1 * | 8/2003 | Daniel et al. | ................ | 715/514 |
| 2003/0204433 A1 * | 10/2003 | Botscheck et al. | ............. | 705/9 |
| 2004/0104939 A1 * | 6/2004 | Locke et al. | ................ | 345/764 |
| 2004/0205706 A1 * | 10/2004 | Portwood | ................... | 717/113 |
| 2005/0138559 A1 * | 6/2005 | Santos-Gomez et al. | .... | 715/709 |
| 2005/0187824 A1 * | 8/2005 | Bonneville | .................. | 705/14 |
| 2005/0209903 A1 * | 9/2005 | Hunter et al. | .................. | 705/9 |
| 2005/0235224 A1 * | 10/2005 | Arend et al. | ................ | 715/792 |
| 2005/0246726 A1 * | 11/2005 | Labrou et al. | ............... | 719/328 |
| 2006/0069604 A1 * | 3/2006 | Leukart et al. | ................. | 705/9 |
| 2006/0080607 A1 * | 4/2006 | Cohen et al. | ................ | 715/705 |
| 2006/0168522 A1 * | 7/2006 | Bala | ........................... | 715/712 |
| 2006/0173726 A1 * | 8/2006 | Hall et al. | ....................... | 705/8 |
| 2006/0242569 A1 * | 10/2006 | Grigoriadis et al. | ......... | 715/517 |
| 2006/0294157 A1 * | 12/2006 | Kumpitsch et al. | .......... | 707/201 |

* cited by examiner

*Primary Examiner*—Tadeese Hailu
(74) *Attorney, Agent, or Firm*—Merchant & Gould, P.C.

(57) ABSTRACT

An application assistance user interface guides, educates, and provides application functionality to a user to reach a goal that relates to their application. For example, a goal may be to provide marketing assistance while creating a publication using a publishing application. Rather than requiring the user to extensively search through menu items in order to complete the project and meet their goal, a user may selectively determine whether or not to perform any of the provided tasks within the application assistance user interface. The interface combines tasks within an interface that may be accessed by the user to complete at least a part of the goal. Selecting one of the tasks leads the user to application features, help topics, Web site locations, or to further tasks that may be used within the scenario to complete the goal.

20 Claims, 10 Drawing Sheets

APPLICATION ASSISTANCE

BACKGROUND

A user interface (UI) provides a way for a user to interact with a computer program. The UI defines how input devices, such as the keyboard and mouse, are utilized to interact with a program on a computing device. The UI also defines how program information is displayed on the screen. One type of UI is a Graphical User Interface (GUI). GUIs display visual controls, such as menus and buttons allowing the user to graphically interact with the functionality of the program. In order to complete a task, a user must navigate through the menus to locate the appropriate menus containing the required functionality to accomplish at least a portion of the task. The user must continue this navigation through the menus until they have completed their task.

Another type of UI is a wizard. A wizard leads a user through each step that is required to complete a task. Before the user can move to the next step, they typically must complete the step currently provided by the wizard. One example of a wizard is a connection wizard which sets up a computer's network settings by asking the user for information on how the computer is connected to the Internet. Many operating systems and programs also use wizards to assist with configuring the programs and operating systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An application assistance user interface is directed at guiding, educating, and providing application functionality to a user. The application assistance user interface displays tasks that may be selected to assist a user in reaching a goal that relates to their current project. For example, a goal of the application assistance user interface may be to provide marketing assistance while creating a publication using a publishing application. Any goal, however, may be defined that relates to the application currently being used. Rather than requiring the user to extensively search through menu items in order to complete the project and meet their goal, a user may selectively determine whether or not to perform any of the provided tasks within the application assistance user interface. Selecting one of the tasks may lead the user to items such as: application features; help topics; Web site locations; or to further tasks that may be used within the scenario to complete the goal.

DETAILED DESCRIPTION

Figure 2:
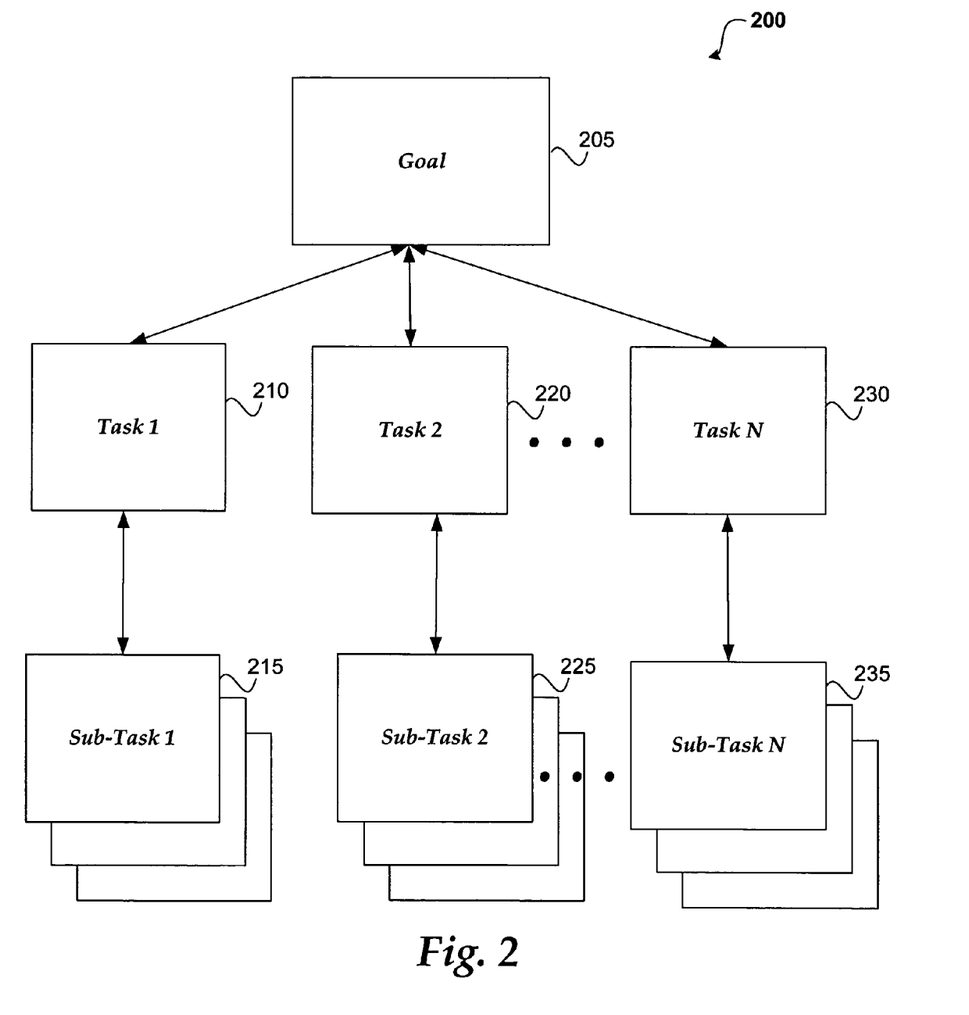
FIG. 2 shows organization of tasks into top level tasks and sub-tasks to reach a goal relating to an application.

FIG. 2 shows organization of tasks into top level tasks and sub-tasks to reach a goal relating to an application, in accordance with aspects of the invention. Goal 205 is the goal of the tasks that are included within an application assistance interface. The goal is directed at providing assistance to users in areas in which they need or desire help. The goal is related to the purpose of the application, and, generally, is closely coupled to the specific project they are working on using the application. For example, when the application is a publishing application, goal 205 may be related to areas in which publishing a document is included. For instance, this may include setting goal 205 to provide marketing assistance. When the application is a word-processing application the goal may be related to creating a newsletter. Other goals may be creating and distributing greeting cards, integrating a spreadsheet into another application, and the like. The number and type of goals that may be defined is unlimited.

Organized under goal 205 are one or more top-level tasks. As illustrated, task 1 (210), task 2 (220) and task N (230) are top-level tasks. Top-level tasks are the primary tasks that are related to reaching the goal.

Hierarchically under the top-level tasks are zero or more sub-tasks. As illustrated, sub-task 1 (215), sub-task 2 (225) and sub-task N (235) are sub-tasks located beneath tasks 1, 2, and 3, respectively. Sub-tasks are more discrete tasks as compared to the top-level tasks. In other words, the sub-tasks may be executed to complete a top-level task. Although not shown, there may be more or fewer hierarchical levels in defining tasks to reach the goal. For example, there may be only one level, two levels, three levels, four levels, or more. According to one embodiment of the invention, the tasks are stored within a list that indicates where they are located hierarchically among the other tasks as well as an action to be performed upon their selection.

Figure 3:
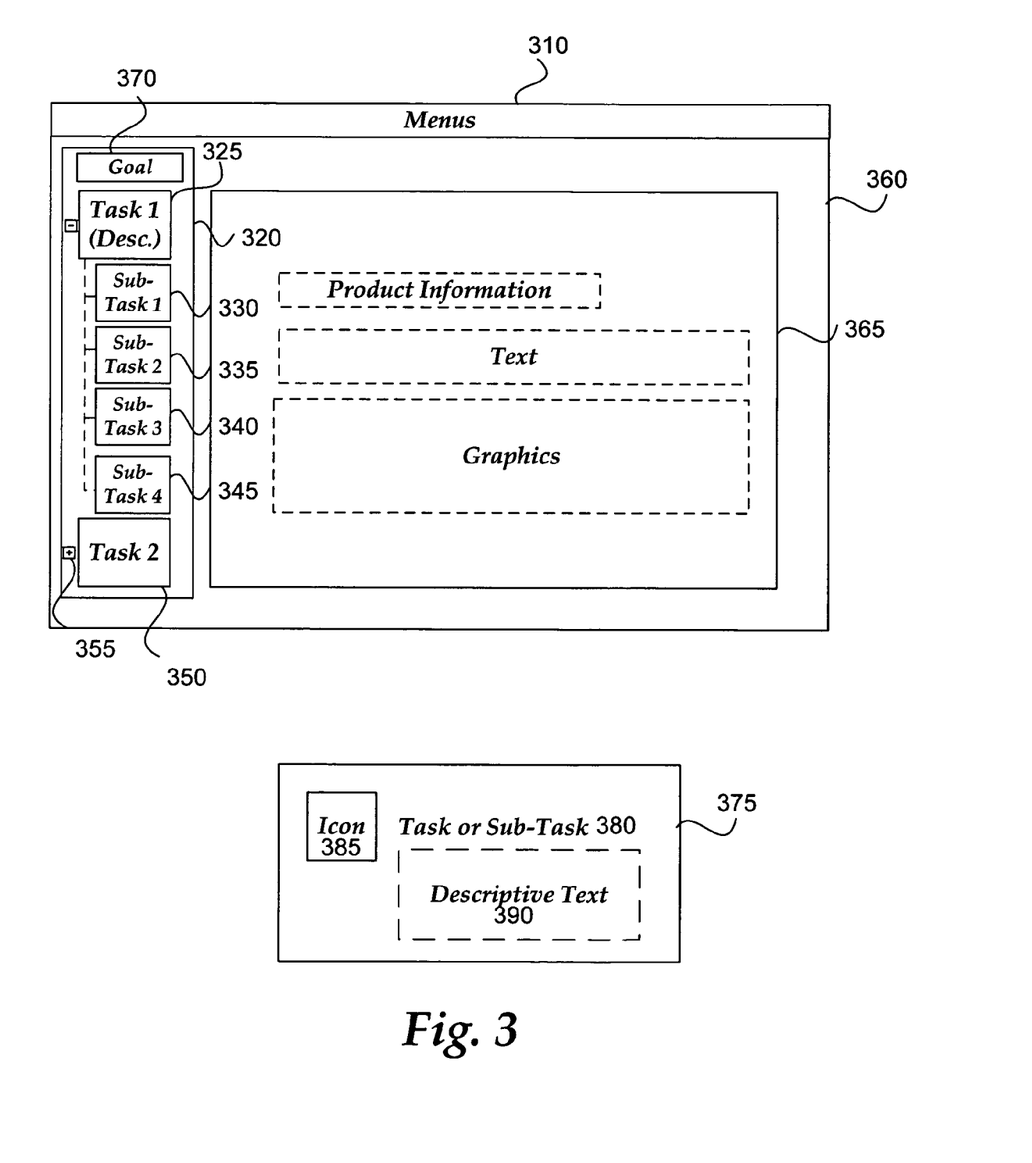
FIG. 3 illustrates an exemplary application assistant user interface relating to reaching a goal.

FIG. 3 illustrates an exemplary application assistance user interface relating to reaching a goal, in accordance with aspects of the invention. As illustrated, screen 300 includes application assistance interface 320, menus 310, application window 360, and document window 365. Application window 360 includes interface 320. Tasks 325, 330, 335, 340, 345, and 350 are tasks that have been determined to assist a user in reaching a goal.

Instead of having to search through the menus (310) of the application for the specific menu item to be performed, tasks relating to the goal are grouped within an interface (320) providing easy access to the user. For example, the tasks may be grouped within an interface task pane (320) located near the document window (360).

The tasks may be accessed to guide, educate, and provide application functionality to a user to assist them in reaching the goal for which the tasks were selected. According to one embodiment, selecting one of the tasks leads the user to application features, Help topics, network site locations such as Web sites, and/or to further tasks. The tasks included within interface 320 may be customized based upon the end user. For example, different task panes may be provided for different target audiences without having to change the underlying application.

The goal of the application assistance included within the interface may be shown in location 370. According to one embodiment, the goal is a short description of the application assistance provided by the tasks. The tasks may be included within an interface in many different ways. In one embodiment, the tasks are exposed in a hierarchical view which uses a tree-control (355) to hide and collapse the illustrated sub-tasks (330, 335, 340 and 345) depending on the state of the control. The tasks may also be displayed as a list within interface 320 (See the example shown in FIGS. 6-9).

In addition to the link text which is used to identify the task, tasks may include and/or reference other related information. For example, the task may include a link description 380, an icon 385, and descriptive text 390.

Referring to the application assistance user interface (320) the user may quickly view and select tasks which may be used to assist in reaching their goal. Unlike a wizard, however, the user is not required to ever select one of the tasks provided within the interface. Additionally, the tasks provided do not, themselves, collect data from a user. Instead, the user may determine which tasks will be useful to them in reaching their goal and select them accordingly. According to one embodiment, the tasks displayed within interface 320 are changed depending on the currently selected task. For example, when sub-task 1 (330) is selected, the tasks currently displayed within the interface (325, 330, 335, 340, 345 and 350) may be replaced with a set of tasks currently not shown within the interface. These tasks could relate to the currently selected task or sub-task. According to another embodiment, the tasks may change based on a state or context of the application. For example, certain tasks may appear or disappear from the displayed tasks after a certain action has been performed. The action may be many different actions. For instance, a user has accessed a data source, or has progressed through a project to a certain point, what actions they appear to be performing or desiring to perform, and the like.

While some of the functionality displayed within the application assistance task pane (320) may be found within the application's menus (310), many users may have difficulty locating this information. Current user interfaces require the user to be familiar with them before starting a project. For example, in order to create a marketing document, including selecting a document, designing the layout and text, addressing for mailing, and printing or otherwise publishing, users must search menu items looking for the feature they need to complete the next subtask, assuming that they even know to look for such a feature.

Providing tasks within an application assistance user interface (320) provides many advantages. One advantage over current user interfaces is that an application assistance user interface guides and educates the user through their end-to-end scenario to reach their goal rather than requiring them to extensively search through menu items and/or other current user interface constructs. More active than typical product Help, the application assistance user interface leads users directly to product functionality, Help, or useful Web resources based on the users goals. The application assistance user interface is populated with tasks that may be used to perform the goal of the project. The application assistance may be customized for the end user. For example, the target audience may be a business user, a power-user; a novice user; and the like.

Figure 4:
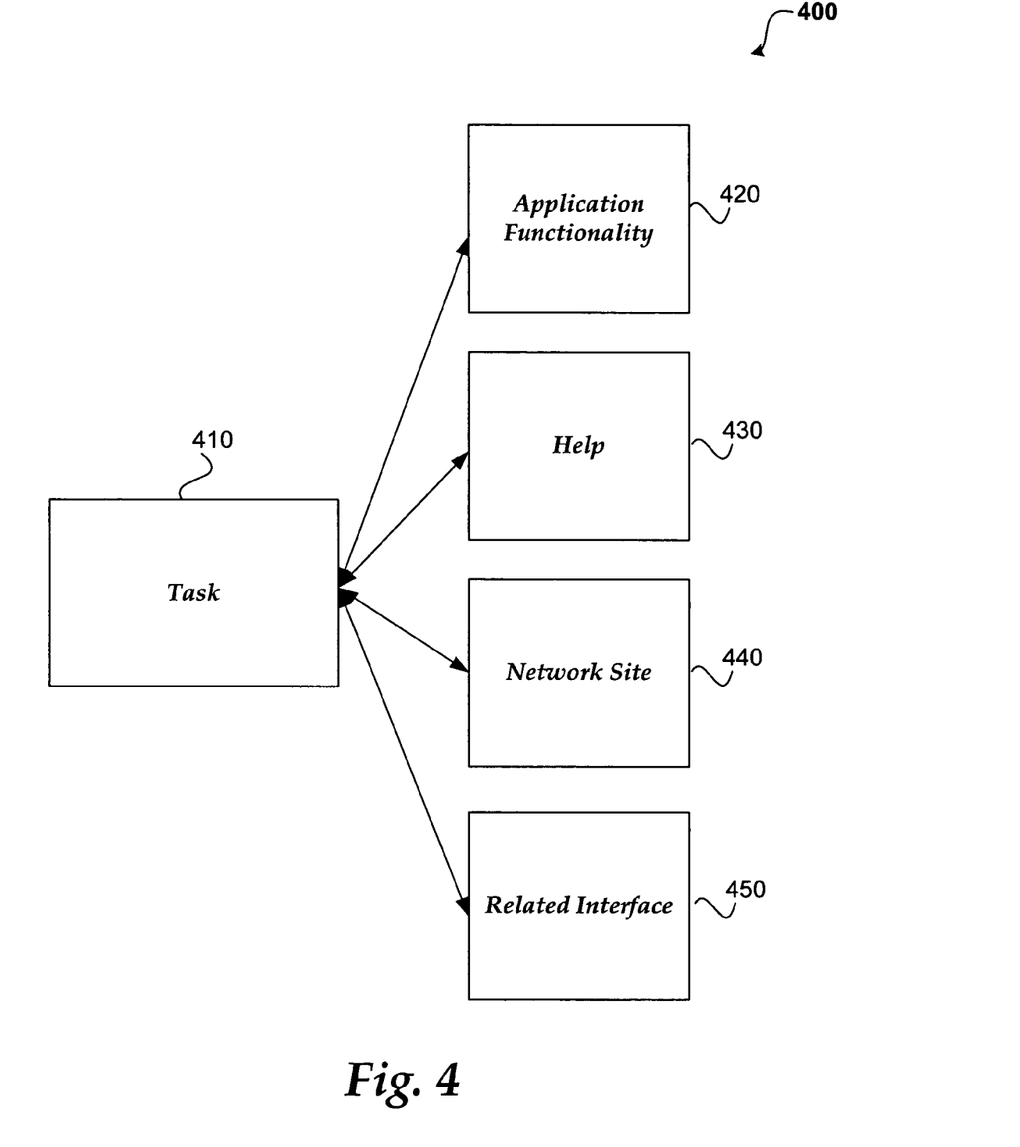
FIG. 4 illustrates exemplary action performed upon the selection of a task within an application assistance user interface.

FIG. 4 illustrates exemplary action performed upon the selection of a task within an application assistance user interface, in accordance with aspects of the invention.

According to one embodiment of the invention, the selection of a task can lead to four different types of destinations. These destinations include: application functionality (420); help topics (430); network sites (440); and other related interfaces (450). Tasks may be configured to go to any number of destinations.

When the destination is application functionality (420) then selecting the link leads to executing some of the functionality of the application. The functionality may be any functionality provided by the application.

Selecting a help topic link (430) provides the user with the relevant help information relating to the task. According to one embodiment, a new help window is opened and the relevant topic is displayed within the window.

When the destination is a network site (440), a page, such as a Web page is opened to the relevant page identified by the task. According to one embodiment, a browser is launched to the page with the relevant resource opened when the browser is not already active upon the computing device.

When the link is directed to a related interface (450), the appropriate tasks relating to the selected link are displayed to the user. Many end-to-end scenarios used to reach a goal may be split up into many different task panes.

Figure 5:
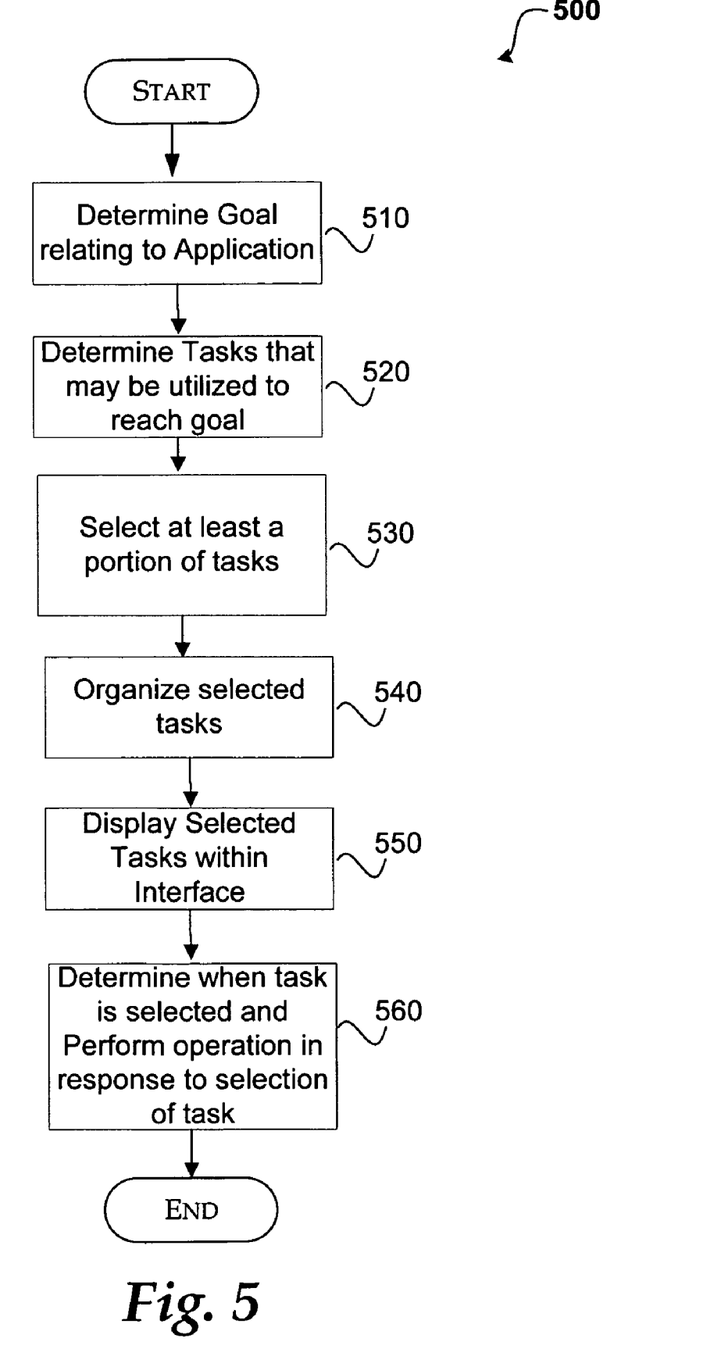
FIG. 5 shows a process relating to an application assistance user interface.

FIG. 5 shows a process relating to an application assistance user interface, in accordance with aspects of the present invention.

After a start block, the process flows to block 510 where the goal relating to the application is determined. As discussed above, the goal is generally related to the purpose of the application and/or specific project a user is working on within the application. For example, when the application is a publishing application and the user is creating a marketing brochure, the goal may be to provide marketing assistance. Many goals may be defined for each application. These goals may also be customized for a user or a set of users.

Moving to block 520, the tasks are determined that may be utilized to reach the goal. The tasks may include functionality included within the application and may include resources and/or functionality from outside of the application. For example, one of the tasks within a publishing program may be to professionally print the publication. In this scenario, one of the tasks could be to print the publication using an outside printing agency that is connected to the user's computer through a network. Another task could be to provide a help article relating to the effective use of graphics within a brochure.

Transitioning to block 530, at least a portion of the determined tasks are selected for inclusion within the application assistance user interface. All or part of the determined tasks may be selected. For example, in some instances it may be determined that it is more effective to only include the high level tasks within the application assistance interface.

Moving to block 540, the tasks are organized for presentation within the interface. According to one embodiment, the tasks are organized hierarchically (See FIG. 2 and related discussion).

Flowing to block 550, the selected and organized tasks are displayed within the interface. According to one embodiment, not all of the tasks are displayed at a single time within the interface. For example, the high level tasks may be initially shown within the interface, and then upon selection of one of the high level tasks, the sub-tasks for the selected higher level tasks are shown.

Moving to block 560, an operation is performed in response to the selection of a task. According to one embodiment, selecting one of the tasks leads the user to application features, Help topics, network site locations such as Web sites, and/or to further tasks.

FIGS. 6-9 show exemplary screen displays illustrating an application assistance user interface, in accordance with aspects of the present invention. While the example illustrates an application assistance user interface providing marketing assistance relating to a publishing application, any number and/or type of assistance interfaces may be designed and created.

Figure 6:
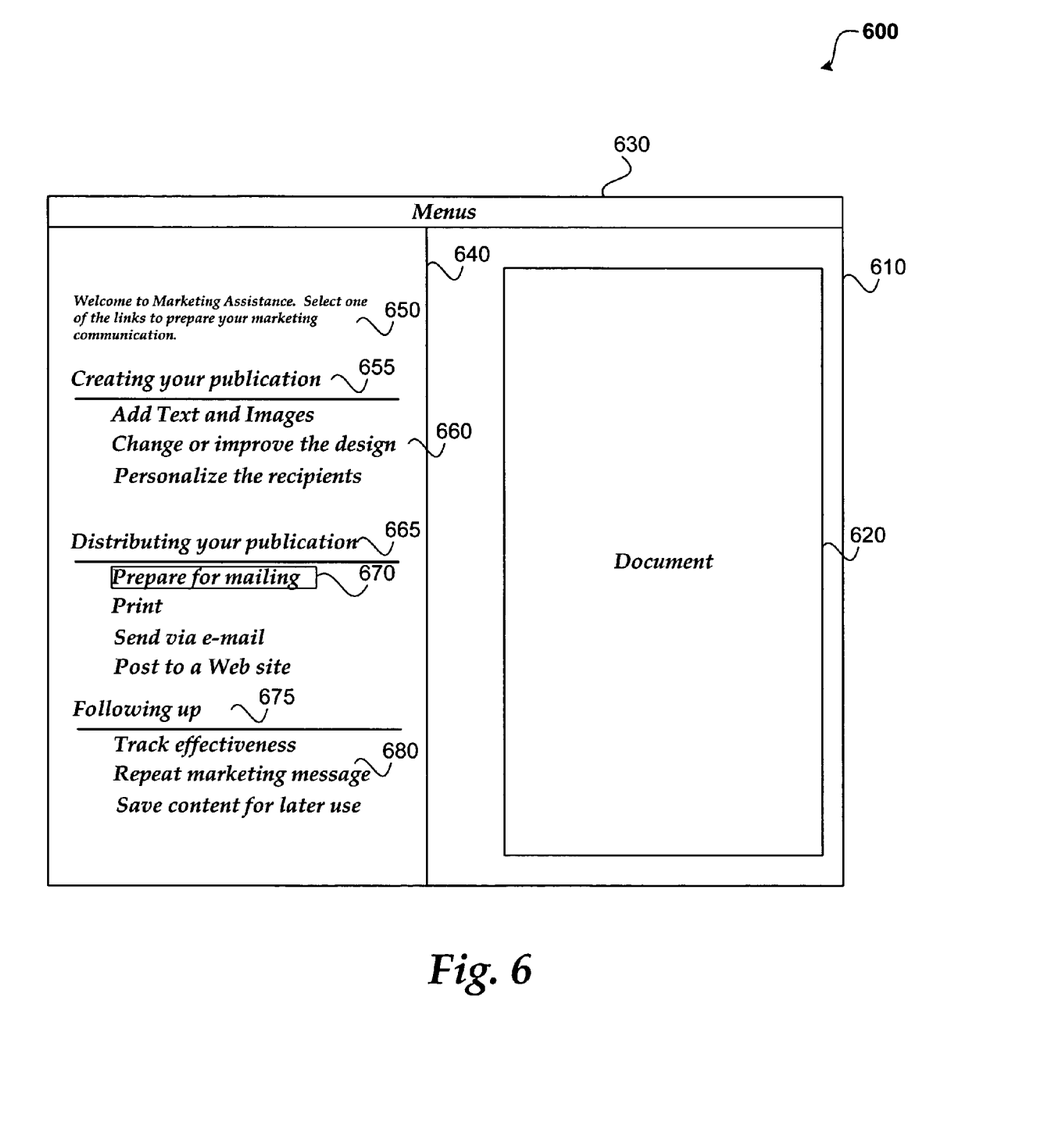
FIGS. 6-9 show exemplary screen displays illustrating an application assistance user interface.

FIG. 6 illustrates an exemplary application assistant user interface configured for a goal of marketing assistance, in accordance with aspects of the invention. As illustrated, screen 600 includes application assistance user interface 640, menus 630, application window 610, and document window 620. Application window 610 includes application assistance interface 640 that is configured as a task pane. Tasks 655, 665 and 675 are top-level tasks. Sub-level tasks (660, 670 and 680) are included beneath the top-level tasks.

Goal description 650 informs the user that the application assistance is related to providing marketing assistance relating to preparing document 620. In the present example, menus 630 are menu items relating to the publishing application being used to create document 620.

The user may select any of the tasks provided within interface 640 at any time while the application is running. Although interface 640 is shown as a task pane within application window 610, interface 640 may be located within another portion of the window, may be sized differently and/or may be displayed within a separate window from application window 610.

The top-level tasks (655, 665 and 675) provide a high level outline of what steps are involved in marketing their communication. The first task is to create the publication (655). The second task is to distribute the publication (665) and the third task is to follow up (675). Although three top-level tasks are shown, the selection of the top-level tasks may vary depending on the designer.

Beneath the top-level tasks are tasks that are selected to help achieve the top-level task. For example, three tasks (660) are included beneath the top-level task of "Creating your publication" (655). These tasks include adding text and images; changing or improving the design; and personalizing the recipients. Four tasks are listed below the top-level task "Distributing your publication" (665), including: prepare for mailing (670); print; send via e-mail; and post to a web site. Three tasks (680) are below the "Following up" (675) top-level task, including: track effectiveness; repeat marketing message and save content for later use.

In this example the user selects the "Prepare for mailing" (670) task.

Figure 7:
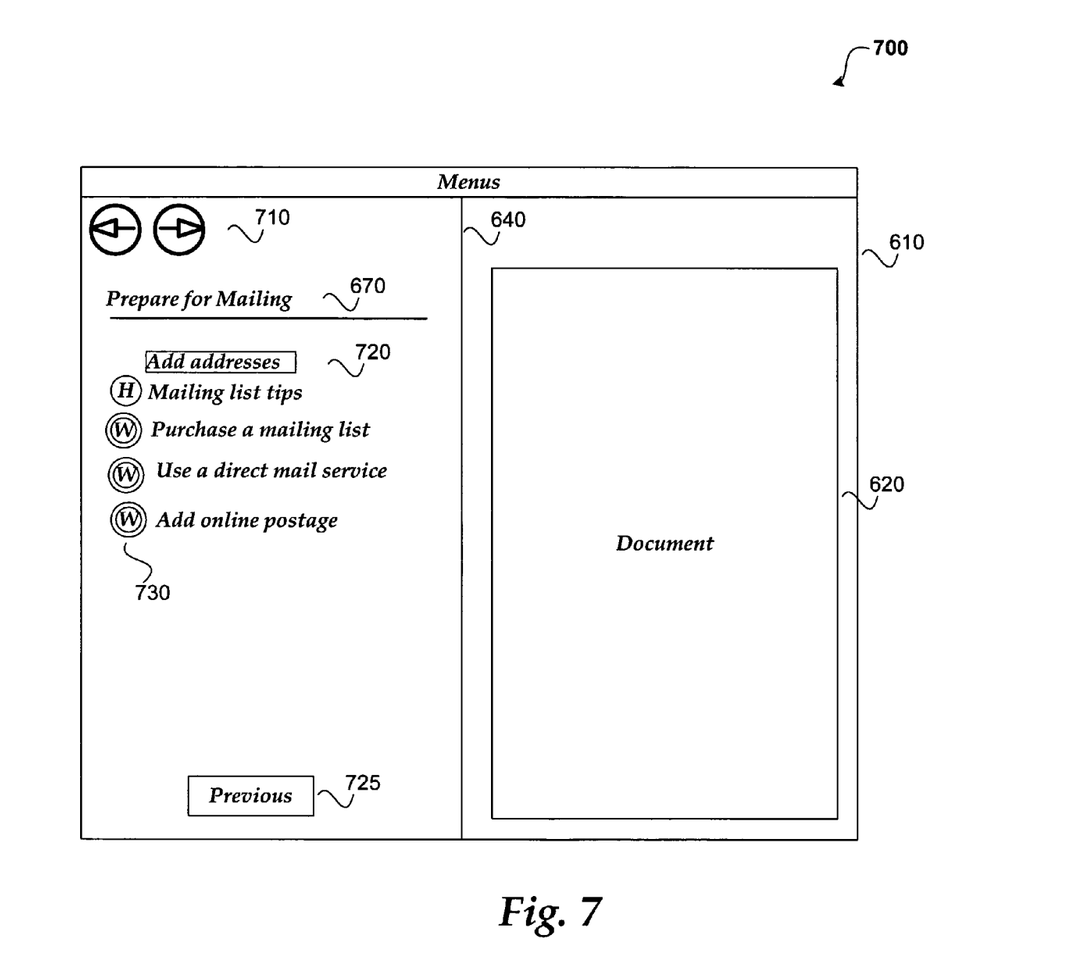

FIG. 7 shows an exemplary screen after selecting a task, in accordance with aspects of the invention. After selecting the "Prepare for mailing" task (670), interface 640 is updated with the tasks that may be used to help achieve preparing the document for mailing. In this example, tasks for placeholder text; add addresses; making list tips; purchase a mailing list; use a directed mail service; and add online postage tasks are displayed within the interface window. The user may select any of these tasks at any time without first having to select one of the previous tasks within interface 640.

According to one embodiment, when the application assistance user interface changes, a return button (725) is displayed that leads back to the previous application assistance task pane. In this example, selecting the previous button (725) would cause the task pane displayed in FIG. 6 to be displayed. Arrow buttons 710 may also be used to navigate forwards and backwards within the application assistance user interface.

Icons 730 have been displayed next to some of the tasks providing the user with more information. As displayed, an "H" icon showing the task is a help related task, and a "W" icon showing the task is a network task is placed next to some of the tasks.

The user selects the "Add addresses" (720) task.

Figure 8:
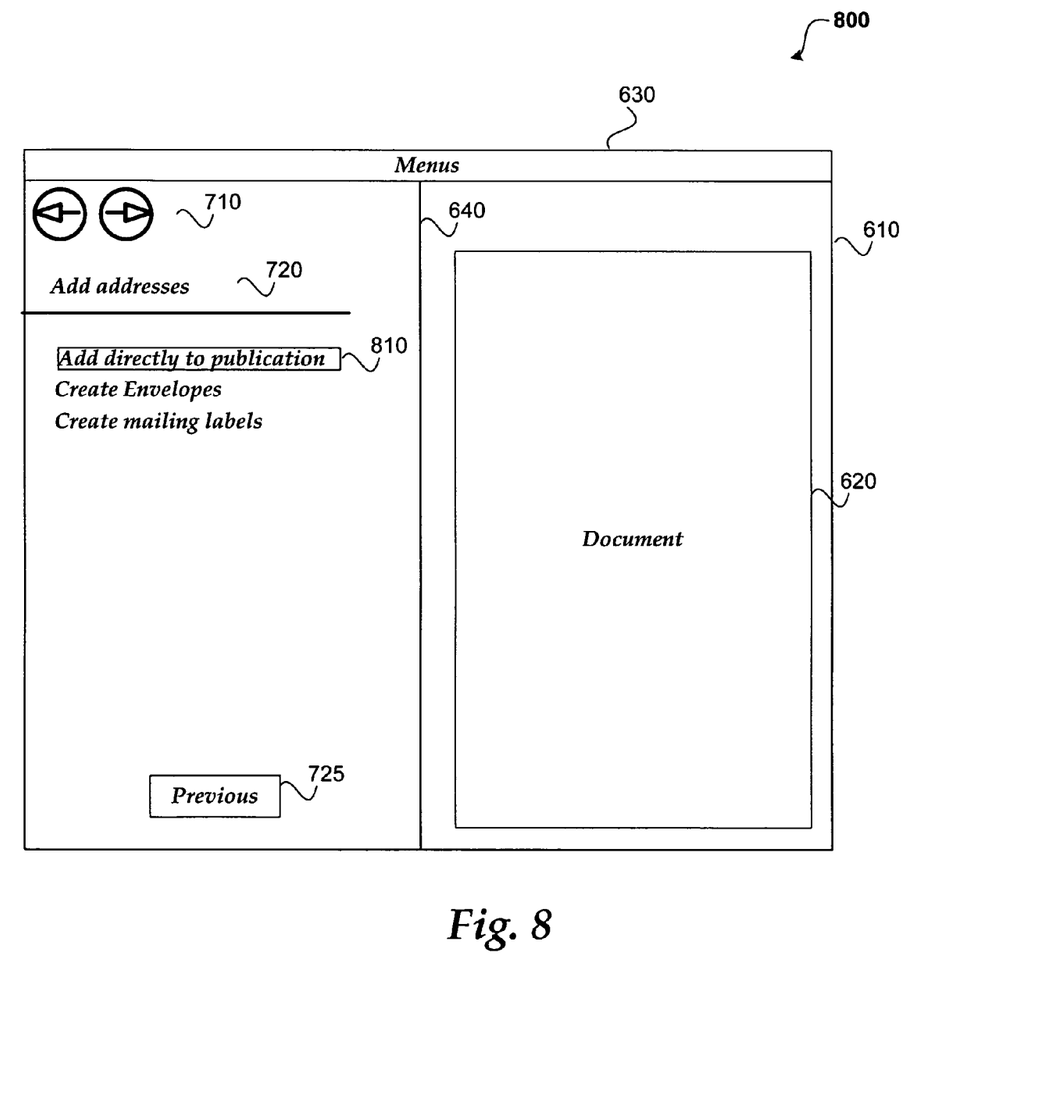

FIG. 8 illustrates exemplary tasks, in accordance with aspects of the invention. Selecting the "Add addresses" (720) task results in display 640 being updated. As illustrated, the tasks "add directly to publication"; "create envelopes"; and create mailing labels (810) are displayed beneath the add addresses (720) task. In the present example, the user selects the "Add directly to publication" (810) task.

Figure 9:
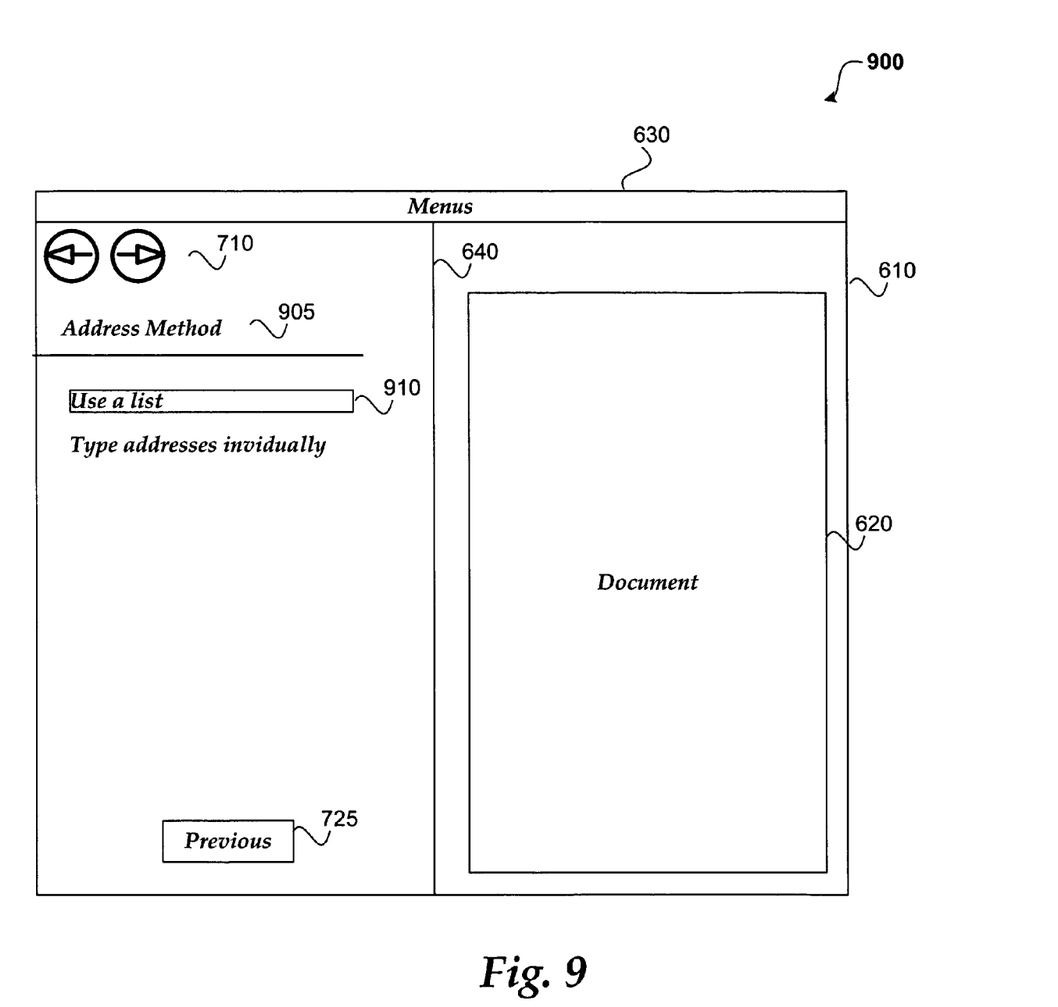

FIG. 9 shows another exemplary screen (900) for marketing assistance, in accordance with aspects of the invention. Screen 900 shows the top-level task name change to "Address Method" (905) and the user selecting the task "Use a list" (910).

Figure 10:
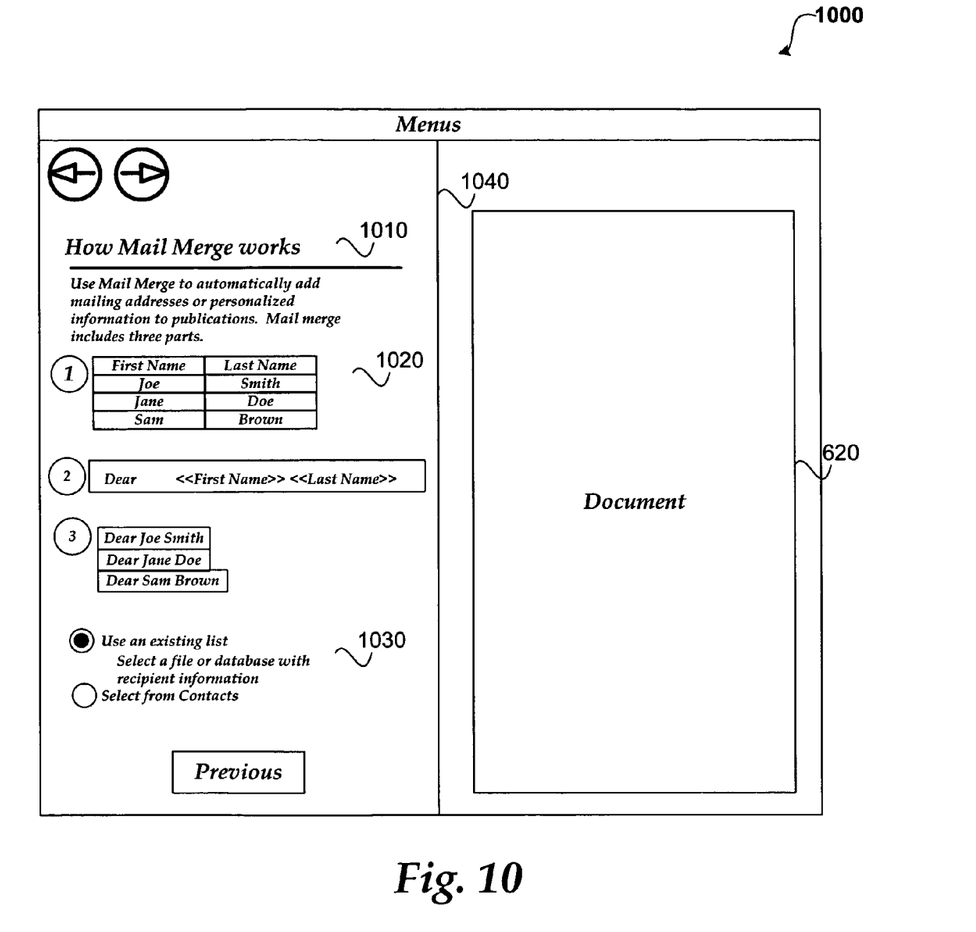
FIG. 10 shows an application feature that is displayed as a result of the user selecting a task in the application interface, in accordance with aspects of the present invention.

FIG. 10 shows an application feature that is displayed as a result of the user selecting a task in the application interface, in accordance with aspects of the invention. Any type of information may be included within interface 1040. In the present example, interface 1040 displays a help section 1020 showing how mail merge works (1010). Beneath the help section (1020), a selection may be made between using an existing list (1030) or selecting from contacts.

Although the example is not illustrated to completion, it is clear that application assistance that is provided to the user may be selectively utilized by a user to help them accomplish a goal.

Illustrative Operating Environment

Figure 1:
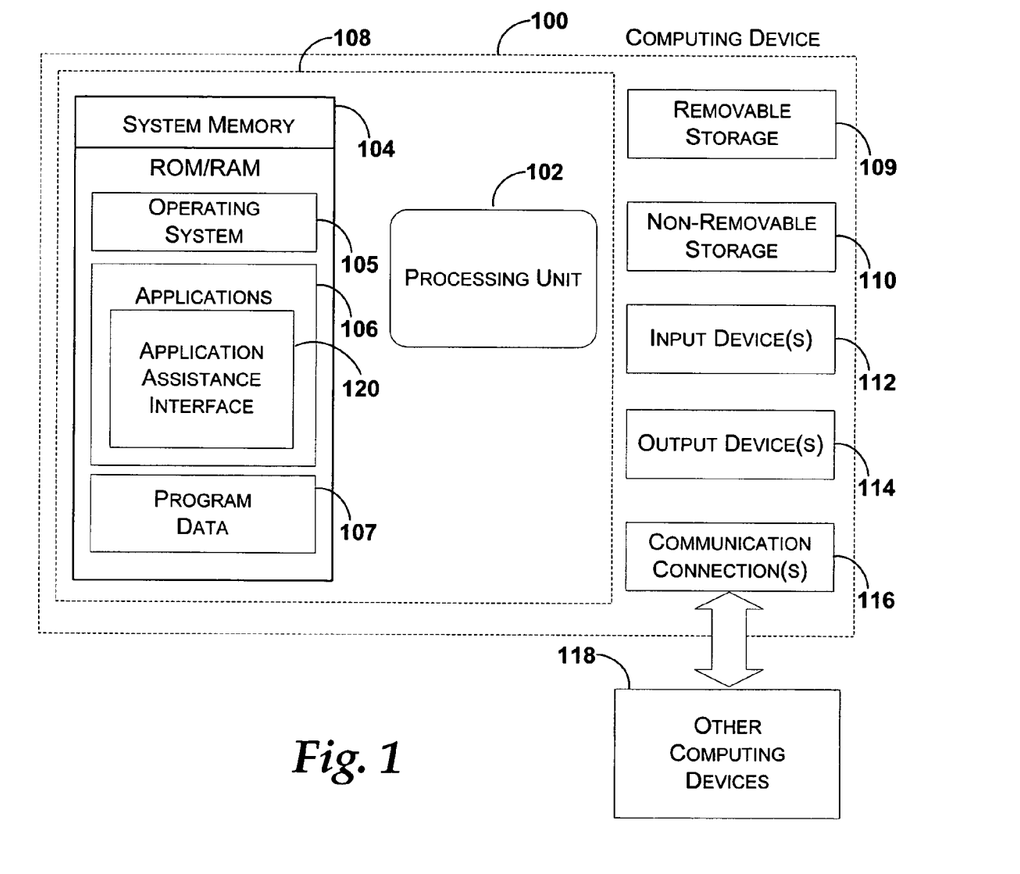
FIG. 1 illustrates an exemplary computing device.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include an application assistance user interface 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing assistance, comprising:
   determining a goal relating to a publishing application that the user is using, the goal relating to a document to be published; wherein reaching the goal requires execution of functionality included within the publishing application the user is using and execution of functionality external to the publishing application the user is using;
   determining tasks that may be utilized in reaching the goal; wherein the tasks include functionality from within the publishing application, functionality from outside of the publishing application, and providing help information related to the functionality included within the publishing application the user is using and to the functionality external to the publishing application the user is using;
   selecting at least a portion of the tasks;
   organizing the selected tasks; and
   displaying the organized tasks within an application assistance task pane such that each of the displayed tasks may be selected; the application assistance task pane including:
      a navigation control, the navigation control allowing the user to navigate between changes of tasks displayed in the application assistance task pane;
      the goal relating to the document to be published;
      a tree-control comprising a hierarchy of the organized tasks related to the document to be published, wherein each organized task in the tree-control includes an icon related to a type of link associated with the organized task, descriptive text related to the organized task, and a link associated with the organized task;
      displaying a document window, the document window displaying the document to be published;
      in response to the selection of an organized task, performing an operation that relates to the content of the document to be published.

2. The method of claim 1, wherein organizing the selected tasks comprises grouping related tasks together.

3. The method of claim 2, wherein performing the operation comprises at least one of: accessing publishing application functionality; providing help information that is related to the task that has been selected; accessing a network site in response to the selection; and accessing another interface that includes some of the organized tasks that have been selected to reach the goal.

4. The method of claim 1, wherein the goal further relates to at least one of marketing the publication document and distributing the publication document.

5. The method of claim 1, wherein displaying the organized tasks within the application assistance task pane are adjacent to the document window of the publishing application.

6. The method of claim 1, wherein determining the tasks that may be used in reaching the goal comprises determining resources outside of the functionality of the publishing application that may be used to reach the goal.

7. The method of claim 6, wherein selecting the tasks comprises selecting at least a portion of the tasks from the resources outside of the functionality of the publishing application.

8. The method of claim 1, wherein determining the goal relating to the publishing application comprises determining the goal based on a target audience.

9. The method of claim 1, wherein displaying the tasks comprises determining what tasks to show based on an interaction within the interface.

10. A computer-readable storage medium having computer-executable instructions for providing assistance within a publishing application a user is using that may be used to complete a goal relating to publication of a document, comprising:
    determining tasks comprising top-level tasks and sub-tasks that may be utilized in completing the goal; wherein reaching the goal requires execution of functionality included within the publishing application the user is using and execution of functionality external to the publishing application the user is using; wherein the top-level tasks and sub-tasks are arranged to be selected to perform functionality from within the publishing application, to perform functionality from outside of the publishing application, and providing help information and wherein the sub-tasks are children of the top-level tasks; wherein the functionality outside of the publishing application includes external functionality that is accessed via a network;
    displaying according to a hierarchy at least a portion of the tasks within an application assistance task pane wherein the hierarchy is arranged to include a goal associated with the top-level tasks and the sub-tasks; wherein the top-level tasks are hierarchical children of the goal and each include a task to be executed to reach the goal, each top-level task and sub-task comprising:
       an icon related to a type of link associated with the task,
       descriptive text related to the task, and
       a link associated with the task;
    displaying a document window, the document window displaying the document to be published;
    determining when a task is selected; and in response to the selection performing an operation based on the link associated with the task that relates to reaching the goal relating to publication of the document such that from the publishing application a user may access help information, access functionality of the publishing application, and through the network access external functionality.

11. The computer-readable medium of claim 10, further comprising organizing the tasks hierarchically and grouping related tasks together.

12. The computer-readable medium of claim 11, wherein performing the operation comprises at least one of: accessing publishing application functionality; providing help information that is related to the task that has been selected; accessing a network site in response to the selection; and accessing another interface that includes some of the organized tasks that have been selected to reach the goal.

13. The computer-readable medium of claim 11, wherein displaying the organized tasks within the application assistance task pane comprises displaying the organized tasks near to the document window.

14. The computer-readable medium of claim 11, wherein determining the tasks comprises determining a target audience and basing the determination of the tasks on the target audience.

15. The computer-readable medium of claim 11, wherein displaying the tasks comprises determining what tasks to display based on an interaction within the interface.

16. An apparatus for providing assistance that relates to completing a goal that relates to a publication document within a publishing application being used, comprising:

means for determining tasks that may be selectively utilized in reaching the goal; wherein reaching the goal requires execution of functionality included within the publishing application being used and execution of functionality external to the publishing application; wherein a portion of the tasks lead to functionality from within the publishing application, a portion of the tasks lead to functionality outside of the publishing application, and a portion of the tasks provide help information; and means for displaying the tasks within a user interface such that each of the displayed tasks may be selected, each displayed task comprising:

descriptive text related to the task, and a link associated with the task; and means for displaying the document to be published;

in response to the selection of a task performing an operation based on the link associated with the task that relates to reaching the goal, the operation related to the document to be published.

17. The apparatus of claim 16, wherein performing the operation comprises at least one of: accessing publishing application functionality; providing help information that is related to the task that has been selected; accessing a network site in response to the selection; and accessing another interface that includes some of the organized tasks that have been selected to reach the goal.

18. The apparatus of claim 16, wherein the means for displaying the tasks within the user interface comprises means for displaying the tasks within a task pane near the document to be published within the publishing application.

19. The apparatus of claim 18, wherein the means for displaying the tasks comprises means for determining what tasks to display based on an interaction within the interface.

20. The apparatus of claim 16, wherein determining the tasks comprises determining a target audience and basing the determination of the tasks on the target audience.

* * * * *